United States Patent
Dhanda et al.

(10) Patent No.: US 8,903,372 B1
(45) Date of Patent: Dec. 2, 2014

(54) PERFORMING NEIGHBOR CELL ACTIVITIES IN A MULTI-STACK DEVICE

(71) Applicant: QUALCOMM Incorporated, San Diego, CA (US)

(72) Inventors: Mungal S. Dhanda, Slough (GB); Raghavendra S. Anand, Hyderabad (IN); Shawn C. Morrison, Boulder, CO (US); Chih-Ping Hsu, San Diego, CA (US); Divaydeep Sikri, Woking (GB); Subbarayudu Mutya, Hyderabad (IN); Sathish Krishnamoorthy, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 13/897,391

(22) Filed: May 18, 2013

(51) Int. Cl.
*H04W 4/00* (2009.01)
*H04W 24/00* (2009.01)

(52) U.S. Cl.
CPC .................................... *H04W 24/00* (2013.01)
USPC ..................................................... 455/422.1

(58) Field of Classification Search
USPC ........................................... 455/422.1, 127.4
See application file for complete search history.

(56) References Cited

U.S. PATENT DOCUMENTS

| | | |
|---|---|---|
| 2011/0117963 A1 | 5/2011 | Wang et al. |
| 2011/0243099 A1 | 10/2011 | Chin et al. |
| 2011/0280166 A1 | 11/2011 | Nien et al. |
| 2011/0292821 A1 | 12/2011 | Chin et al. |
| 2013/0064176 A1 | 3/2013 | Hsu et al. |
| 2013/0176891 A1 | 7/2013 | Lee et al. |

FOREIGN PATENT DOCUMENTS

| | | |
|---|---|---|
| EP | 1968283 A1 | 9/2008 |
| WO | 2012041735 A1 | 4/2012 |
| WO | 2012053755 A2 | 4/2012 |

OTHER PUBLICATIONS

International Search Report and Written Opinion—PCT/US2014/038524—ISA/EPO—Oct. 17, 2014.

*Primary Examiner* — Joel Ajayi
(74) *Attorney, Agent, or Firm* — The Marbury Law Group, PLLC

(57) ABSTRACT

Systems, methods, and devices providing a framework which reduces the amount of switching required by single transceiver hardware chain mobile devices operating multiple cellular technology and/or service stacks. The various embodiments enable two or more service stacks on the mobile device of various cellular technologies (e.g., 3GPP GSM, UMTS, LTE, WCDMA, etc), to share information, such as network measurements. The various embodiments may also enable one service stack to perform procedures for and provide information to another service stack.

16 Claims, 5 Drawing Sheets

US 8,903,372 B1

PERFORMING NEIGHBOR CELL ACTIVITIES IN A MULTI-STACK DEVICE

BACKGROUND

Mobile devices, such as smart phones, are evolving to support multiple different cellular technologies provided by multiple different wireless service providers, as well as supporting more than one service contract with different wireless service providers. A mobile device supporting more than one cellular technology and/or service provider may have only a single transceiver hardware chain (i.e., a single radio device). In a mobile device with only a single transceiver hardware chain, the different cellular technologies and/or service stacks must timeshare the transceiver hardware. When one stack on the mobile device is operating in a connected mode, such as during a voice and/or data call, switching the transceiver hardware from supporting one service stack to another (i.e., "tune away") may result in dead time for the connected stack.

SUMMARY

The systems, methods, and devices of the various embodiments provide a framework which reduces the amount of switching required by single transceiver hardware chain mobile devices operating multiple cellular technologies and/or service stacks, such as single radio digital short range radio (DSRR) devices. The various embodiments enable two or more service stacks on the mobile device of various cellular technologies (e.g., 3GPP GSM, UMTS, LTE, WCDMA, etc), to share information, such as network measurements. The various embodiments may also enable one service stack to perform procedures for and provide information to another service stack on the mobile device.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
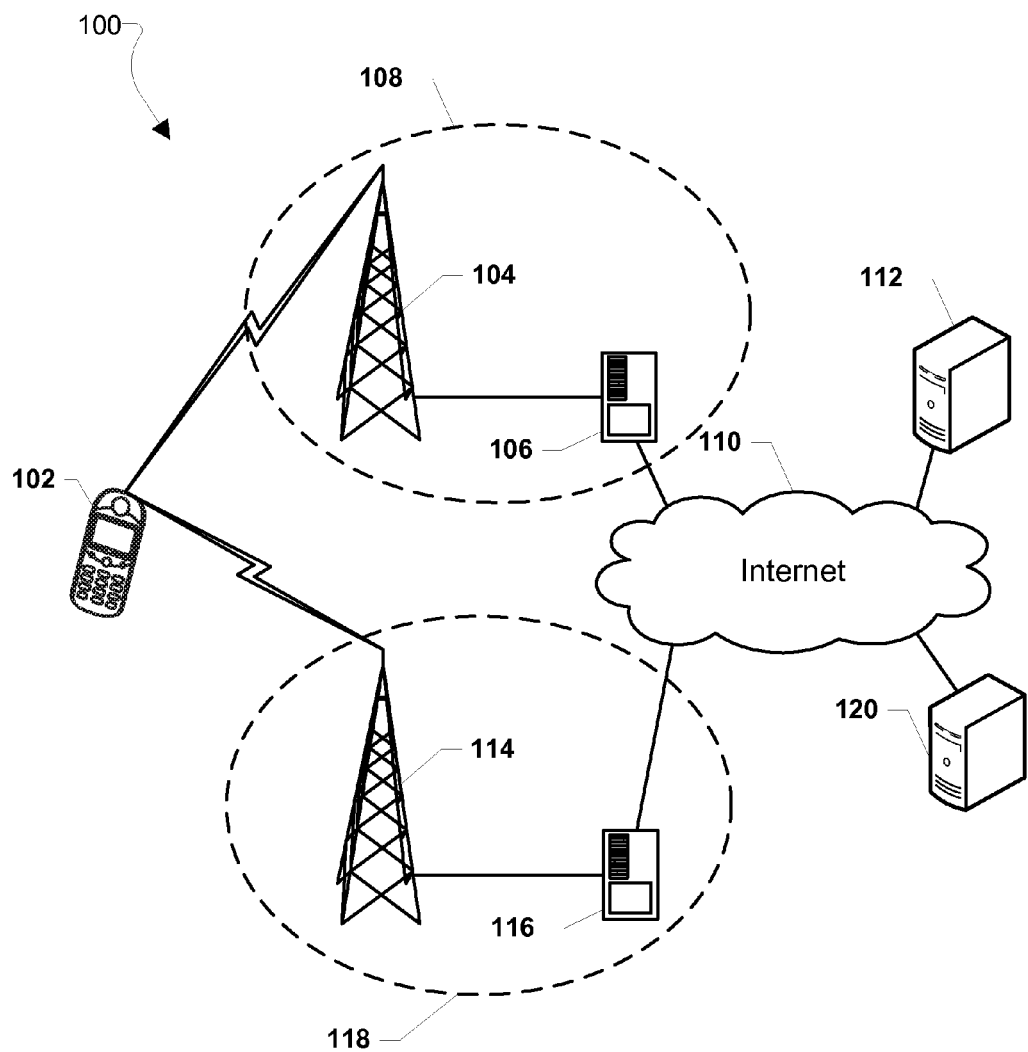
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "receiver device" are used interchangeably herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, and similar personal electronic devices which include a programmable processor and memory and circuitry for operating multiple cellular technologies and/or service stacks.

As used herein, the term "service stack" is used herein to refer to hardware, software, or a combination hardware and software for operating with a cellular technology. A service stack may operate with one cellular technology, such as 3GPP GSM, UMTS, LTE, WCDMA, by controlling the transceiver hardware of a mobile device to communicate with radio access networks (RANs) operating on the service stack's.

The various embodiments provide a framework which reduces the amount of switching required by single transceiver hardware chain mobile devices operating multiple cellular technology and/or service stacks. An example of such a mobile device is a digital short range radio ("DSSR")) device that has two or more SIM cards but only a single transceiver chain. The various embodiments enable two or more service stacks on the mobile device belonging to the same family of cellular technology (e.g., 3GPP GSM, UMTS, LTE, WCDMA, etc), to share information, such as network measurements. The various embodiments may also enable one service stack to perform procedures for and provide information to another service stack on the mobile device.

Mobile devices, such as smart phones, are evolving to support multiple different cellular technologies provided by multiple different wireless service providers as well as supporting more than one service contract with different wireless service providers. A mobile device supporting more than one cellular technology and/or service provider (may have only a single transceiver hardware chain (i.e., single radio device). In a mobile device with a single transceiver hardware chain (i.e., a single transceiver channel), the different cellular technologies and/or service stacks must timeshare the transceiver hardware (i.e., transceiver channel). When one service stack on the mobile device is operating in a connected mode, such as during a voice and/or data call, switching the transceiver hardware from supporting one service stack to another (i.e., "tune away") may result in dead time for the connected stack.

As an example, when a first service stack, such as a Global System for Communications ("GSM") stack, is in a dedicated call, a second service stack, such as a Wideband Code Division Multiple Access ("WCDMA") stack, may need to perform inter-radio access technology ("inter-RAT") GSM neighbor cell measurements. Currently, to provide the WCDMA stack with the inter-RAT GSM neighbor cell measurements, the GSM call must be paused, the transceiver must be tuned away to the WCDMA subscription frequency, the GSM measurements for the WCDMA stack must be initiated, the transceiver must be tuned to the GSM frequencies, and then the WCDMA stack may perform the inter-RAT GSM neighbor cell measurements. After the inter-RAT GSM neighbor cell measurements are completed the transceiver is tuned back to the WCDMA subscription. Only after the idle activities of the WCDMA stack are completed is the transceiver turned back over to the GSM stack and tuned back to the GSM subscription frequencies and the GSM call resumed. This example illustrates the problem with conventional devices in that the transceiver is tuned away from GSM frequencies to eventually measure GSM frequencies, resulting in unnecessary dead time. Additionally, the neighbor cells for the GSM stack and the WCDMA stack may be the same, which may result in current mobile devices performing duplicate measurements of the same neighbor cells.

The various embodiments enable two or more service stacks on the mobile device to share cell signal strength measurement data with each other. By sharing signal measurement data, one service stack may remain in an idle state while the other service stack performs signal measurements and provides signal measurement data to the idle service stack. The various embodiments leverage the commonalities among various cellular technologies to share common functions among different service stacks. The various embodiments enable an active service stack to perform measurements, such as idle mode measurements, for an idle service stack. For example, a WCDMA service stack at times may need to perform GSM inter-RAT measurements as part of its idle mode, and the WCDMA service stack may request a GSM service stack perform the GSM inter-RAT measurements and provide the measurement data back to the WCDMA service stack.

The various embodiments enable the sharing of signal measurement data between service stacks in a variety of example mobile device and network configurations. In an embodiment, a mobile device may support a single subscription (i.e., a single subscriber identity module (SIM)) served by two service stacks, a first and second service stack. The first service stack and the second service stack may be camped on different RANs, but serve the same core network. As an example, the single subscription may use one RAN for packet service, e.g., 3G/HSPA/LTE, while the other RAN may be used for circuit switched service CDMA/GSM. The service stacks are likely to have similar neighbor cells, thus one service stack may perform the measurements for both stacks.

In another embodiment, one service stack may send a request for neighboring cell measurement data to another active service stack. The request may identify the neighboring cells to be measured. The active service stack may identify any common neighboring cells to prevent the duplicate measurement of matching neighboring cells. The active service stack may then measure any unique cells and any common neighbor cells, and may provide the measurement data for the requested neighboring cells back to the requesting service stack. In this manner, each neighboring cell may only be measured once, even though the measurement data of any given neighboring cell may be of interest to both service stacks.

In another embodiment, a first service stack may determine whether another service stack would be more efficient to measure the first service stack's neighboring cells, and request the other stack measure the neighboring cells if the other stack is more efficient. As an example, a first service stack may operate in a WCDMA technology and a second stack may operate in a GSM technology. When the second service stack enters an idle mode, the second service stack may determine that based on the first service stack being a WCDMA technology stack, it would be more efficient for the second service stack to perform its own measurements (i.e., take control of the transceiver hardware chain to measure its GSM neighboring cells) rather than have the first service stack attempt to measure the GSM neighboring cells.

FIG. 1 illustrates a wireless network system 100 suitable for use with the various embodiments. The wireless network system 100 may include a mobile device 102 in communication with radio access networks (RANs) 108 and 118 connected to the Internet 110 and core networks 112 and 120. RAN 108 may include one or more base stations 104 connected to one or more base station controllers 106 connected to the Internet 110. RAN 118 may include one or more base stations 114 connected to one or more base station controllers 116 connected to the Internet 110. RANs 108 and 118 may be from the same family of cellular technology (e.g., 2G, 3G, CDMA, GSM, UMTS, LTE, WCDMA, etc) or from different families of cellular technology (e.g., 2G, 3G, CDMA, GSM, UMTS, LTE, WCDMA, etc). Core networks 112 and 120 may be networks associated with different service providers, such as AT&T®, Sprint®, or Verizon®, and may share the use of RANs 108 and 118 or may exclusively use RANs 108 or 118.

Figure 2:
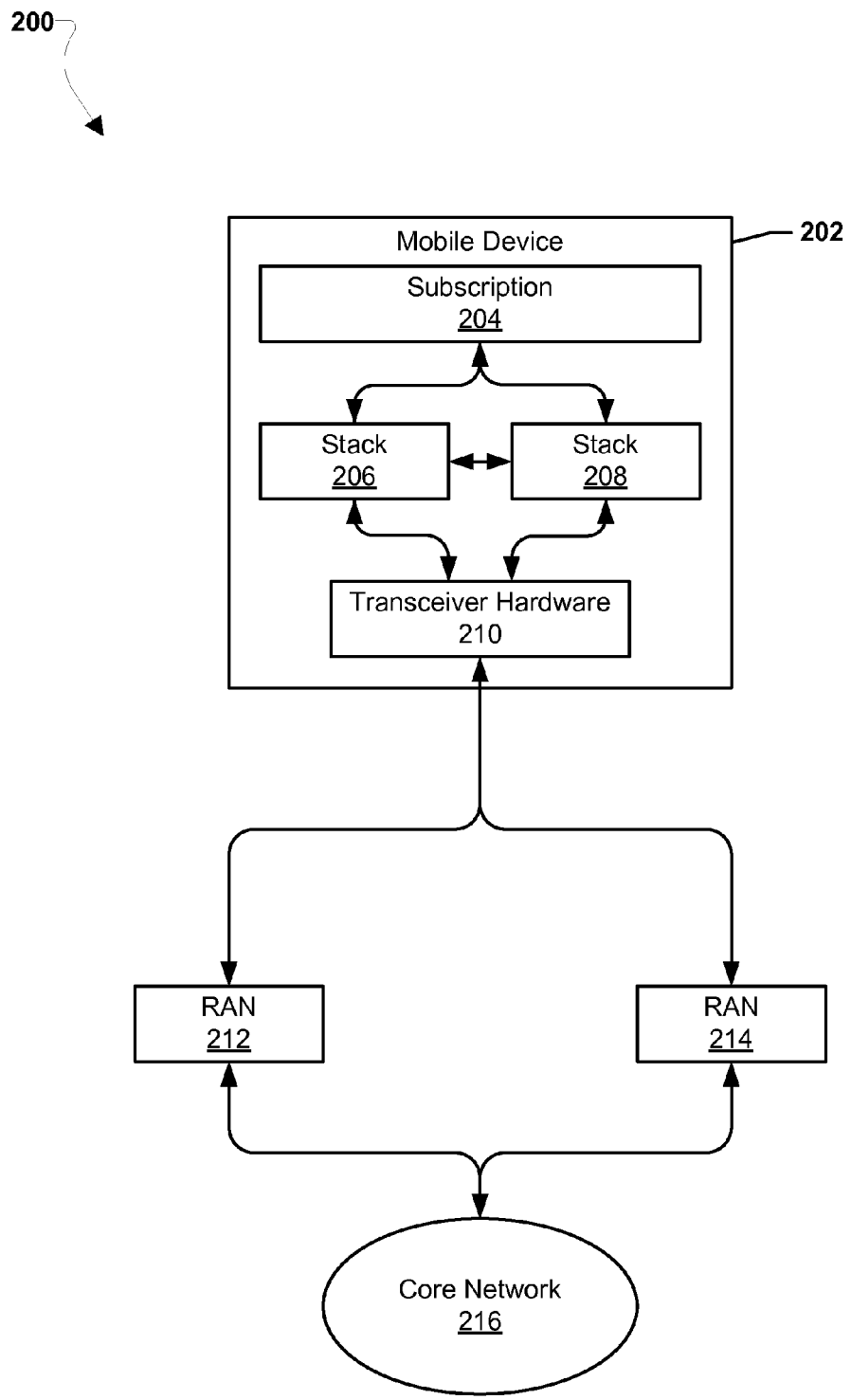
FIG. 2 is a communication system block diagram of a mobile device, two radio access networks, and one core network according to another embodiment.

FIG. 2 illustrates an embodiment system 200 in which a mobile device 202 may be in communication with two RANs 212 and 214, each connected to the same core network 216. The mobile device 202 may include one subscription service 204 (e.g., a SIM card) served by two service stacks 206 and 208. The service stacks 206 and 208 may be in communication with each other and the transceiver hardware chain 210. The transceiver hardware chain 210 may connect the mobile device 202 to the RANs 212 and 214. In an embodiment, service stacks 206 and 208 may be camped on different RANs 212 and 214, respectively, but serve the same core network 216 and same subscription service 204. As an example, the subscription service 204 may use one service stack 206 and RAN 212 for packet service (e.g., 3G/HSPA/LTE) while the other service stack 208 and RAN 214 are used for circuit switched service (e.g., CDMA/GSM). In an embodiment, the service stacks 206 and 208 may have similar neighbor cells, thus one service stack 206 or 208 may perform measurements for both stacks 206 and 208.

Figure 3:
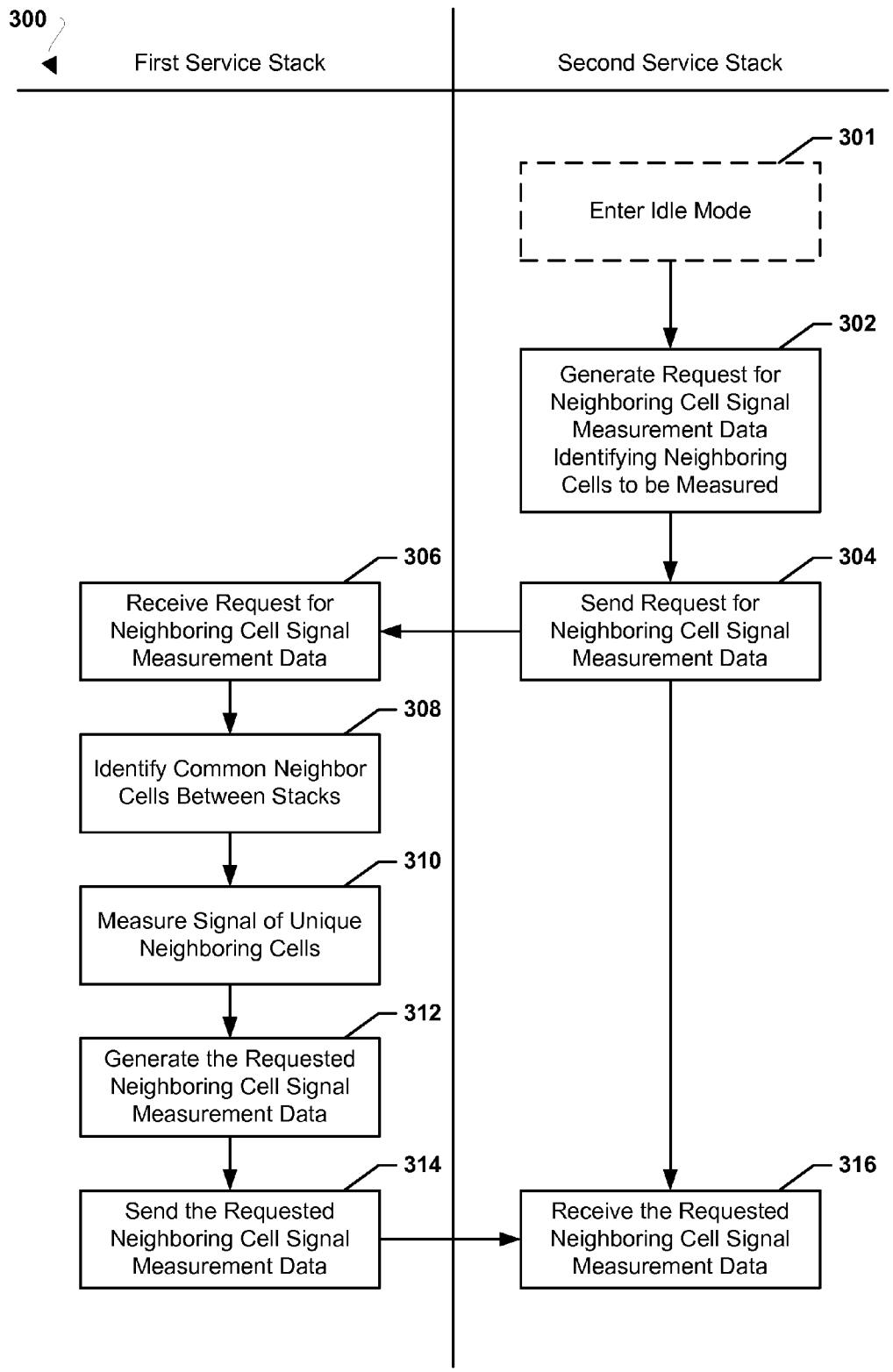
FIG. 3 is a process flow diagram illustrating an embodiment method for performing neighboring cell signal measurements.

FIG. 3 is a process flow diagram illustrating an embodiment method 300 for performing neighboring cell signal measurements in a mobile device having a first service stack and a second service stack, but a single transceiver channel. In an embodiment, the operations of method 300 may be performed by a processor of a mobile device. While the operations of method 300 are illustrated as occurring on the second service stack or the first service stack, the performing stack could be swapped for each service stack (i.e., the first service stack may perform the operations illustrated as performed by the second service stack and vice versa). In an optional embodiment, in optional block 301 the second service stack may enter an idle mode. In this manner, when the second service stack is in an idle mode, it may request the first service stack perform any required neighboring cell signal measurements.

In block 302 the second service stack may generate a request for neighboring cell signal measurement data identifying the neighboring cells to be measured. In an embodiment, the second service stack may be required to periodically measure the neighboring cells of the current cell associated with the second service stack and may store the neighboring cell IDs and neighboring cell information, such as each neighboring cells assigned channel, frequency, encoding, etc., in a memory available to the second service stack. As an example, the neighboring cell IDs and neighboring cell information may be stored in a neighbor cell data table in a memory available to the second service stack, and the second service stack may generate a request for neighboring cell signal measurement data including the information stored in the neighbor cell data table. In an embodiment, the request for neighboring cell signal measurement data may include the neighboring cell ID and neighboring cell information, such as each neighboring cell's assigned channel, encoding, frequency, etc., and an indication of one or more required measurement to be performed, such as signal strength measurements, cell identification, etc. In an additional embodiment, the request may also include subscription information specific to the radio technology of the second service stack, such as a subscription ID, which the first service stack may require to perform measurements for the second service stack. In block 304 the second service stack may send the request for neighboring cell signal measurement data 304 to the first service stack, and in block 306 the first service stack may receive the request for neighboring cell signal measurement data.

In block 308 the first service stack may identify common neighbor cells between the two stacks. As an example, the first service stack may compare a listing of the current neighboring cell neighboring cell IDs to the request for neighboring cell signal measurement data received from the second service stack, and identify any matching neighboring cell IDs as indicating common neighboring cells between the first and second service stacks. In block 310 the first service stack may measure signals of the unique neighboring cells between the first service stack and the second service stack. Measuring the signal of unique neighboring cells may include tuning the transceiver hardware chain of the mobile device to receive signals from each unique neighboring cell. In an embodiment, the first service stack may perform required signal measurements for its own neighboring cells and any second service stack neighboring cells which are not common to the first neighboring cells. In this manner, common neighboring cells between the first service stack and second service stack may be measured only once. In this manner, redundant measurements may be avoided, reducing the overall measurement time. Additionally, the measurement of neighboring cell signals by the first service stack may prevent the loss of time in transferring control of the transceiver hardware chain to the second service stack and back to the first service stack, time lost in establishing connections between the second service stack and its current cell, etc. As examples, measuring the signal of the unique neighboring cells may include measuring signal strength, performing inter-RAT measurements, performing cell identification of the neighboring cells, etc. In block 312 the first service stack may generate the requested neighboring cell signal measurement data. In block 314 the first service stack may send the requested neighboring cell signal measurement data to the second service stack, and in block 316 the second service stack may receive the requested neighboring cell signal measurement data from the first service stack.

Figure 4:
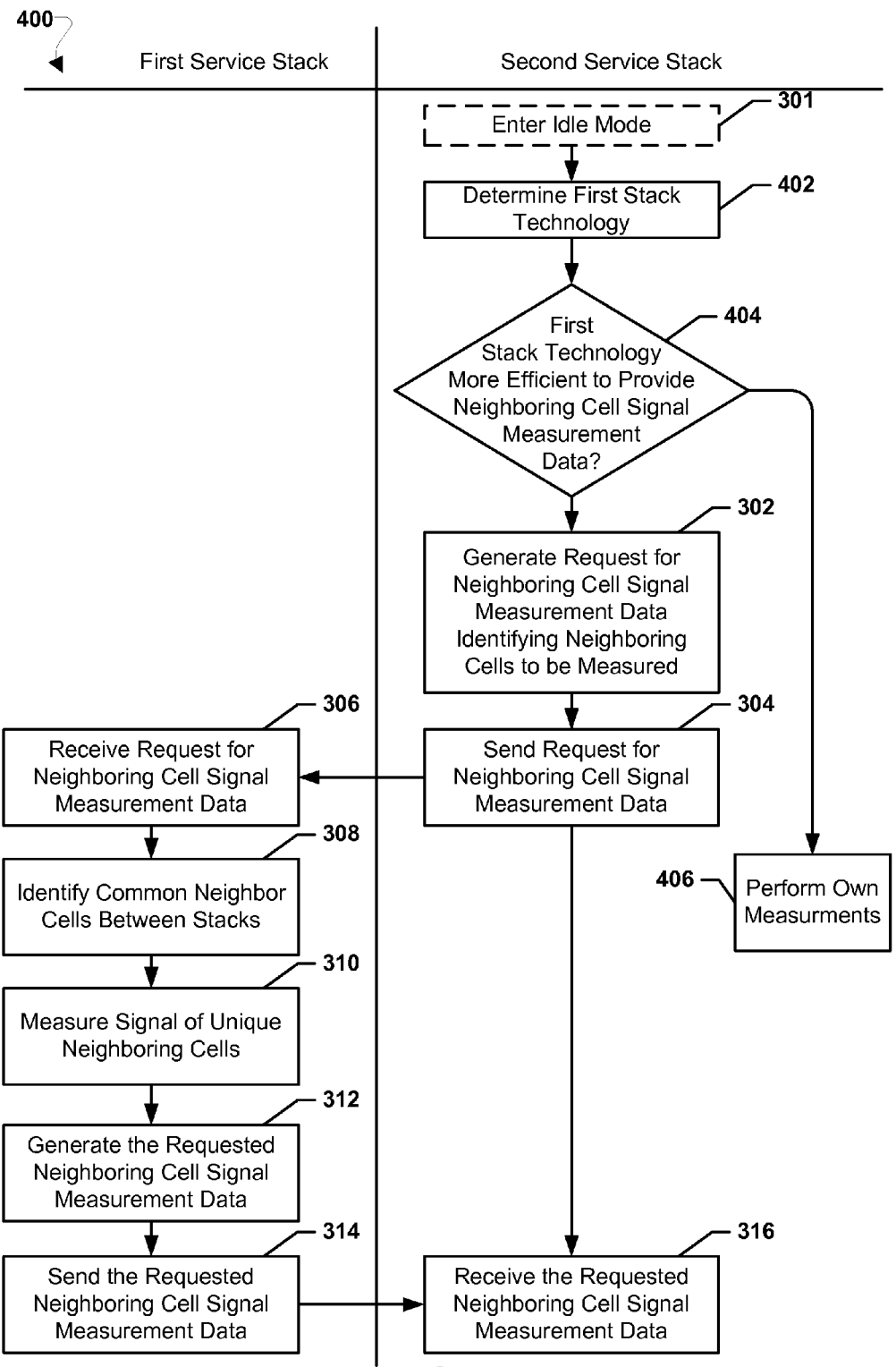
FIG. 4 is a process flow diagram illustrating an embodiment method for performing neighboring cell signal measurements.

FIG. 4 is a process flow diagram illustrating an embodiment method 400 for performing neighboring cell signal measurements in a mobile device having a first service stack and a second service stack, but a single transceiver channel. Embodiment method 400 is similar to method 300 described above with reference to FIG. 5, except that the second service stack may determine whether or not to request the first service stack perform measurements based on the efficiency of the first service stack's radio technology in measuring the second service stack's neighboring cells. In this manner, when the technology of the first service stack would not result in the first service stack performing more efficient measurements for the second service stack, the second service stack may perform its own neighboring cell measurements. As an example, if the second service stack is a GSM service stack and the first service stack is a WCDMA service stack, the second service stack may determine having the first service stack perform the measurements would not be efficient, and may perform its own measurements. In an embodiment, the operations of method 400 may be performed by a processor of a mobile device. While the operations of method 400 are illustrated as occurring on the second service stack or the first service stack, the performing stack could be swapped for each service stack (i.e., the first service stack may perform the operations illustrated as performed by the second service stack and vice versa).

In an optional embodiment, as discussed above, in optional block 301 the second service stack may enter an idle mode. In block 402 the second service stack may determine the first service stack's radio technology. As an example, the second service stack may determine whether the first service stack is a GSM service stack or a WCDMA service stack. In an embodiment, an indication of the technology associated with each service stack of the mobile device may be stored in a memory of the mobile device, and the second service stack may reference the memory of the mobile device to determine the technology of the first service stack. In determination block 404 the second service stack may determine whether the first service stack technology is more efficient than the technology of the second service stack to provide neighboring cell signal measurement data. In an embodiment, the mobile device may have stored in a memory available to the second service stack a data table ranking stack technologies by efficiency and the second service stack may compare the ranking of the determined technology of the first service stack to its own technology to determine whether the first stack technology is more efficient to provide neighboring cell signal measurement data. If the first service stack technology is not more efficient to provide neighboring cell signal measurement data (i.e., determination block 404="No"), in block 406 the second service stack may perform its own signal measurements. If the first service stack technology is more efficient (i.e., determination block 404="Yes"), in blocks 302, 304, 306, 308, 310, 312, 314, and 316 the second service stack and the first service stack, respectively, may perform operations of like numbered blocks of method 300 described above with reference to FIG. 3.

Figure 5:
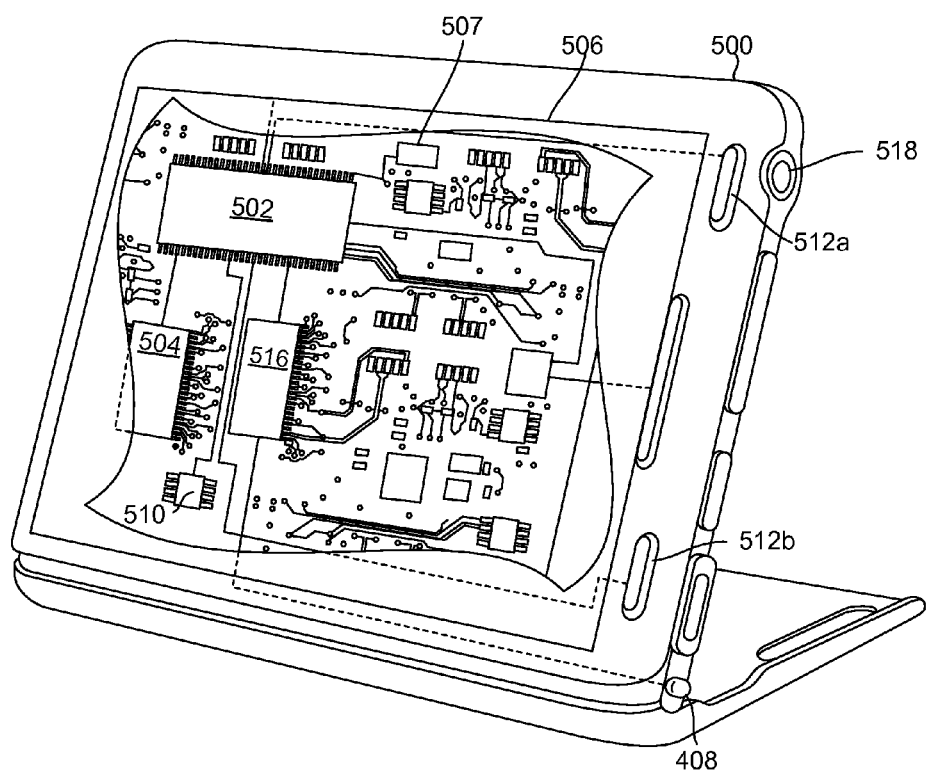
FIG. 5 is a component diagram of an example mobile device suitable for use with the various embodiments.

The various embodiments may be implemented in any of a variety of computing devices, an example of which is illustrated in FIG. 5. For example, the computing device may be a wireless device 500 (e.g., a smart phone). Wireless device 500 may include a processor 502 coupled to internal memories 504 and 510. Internal memories 504 and 510 may be volatile or non-volatile memories, and may also be secure and/or encrypted memories, or unsecure and/or unencrypted memories, or any combination thereof. The processor 502 may also be coupled to one or more touch screen displays 506, such as a resistive-sensing touch screen, capacitive-sensing touch screen infrared sensing touch screen, or the like. Additionally, the display of the wireless device 500 need not have touch screen capability. Additionally, the wireless device 500 may have one or more antenna 508 for sending and receiving electromagnetic radiation that may be connected to a wireless data link and/or cellular telephone transceiver 516 coupled to the processor 502. The wireless device 500 may have a subscriber identity module (SIM), such as a SIM circuit and/or card, coupled to the processor 502. The wireless device 500 may also include physical buttons 512a and 512b for receiving user inputs. The wireless device 500 may also include a power button 518 for turning the wireless device 500 on and off.

The processor 502 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 504 and/or 510 before they are accessed and loaded into the processor 502. The processor 502 may include internal memory sufficient to store the application software instructions. In many devices the internal memory may be a volatile or nonvolatile memory, such as flash memory, or a mixture of both. For the purposes of this description, a general reference to memory refers to memory accessible by the processor 502 including internal memory or removable memory plugged into the device and memory within the processor 502 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of performing neighboring cell signal measurements in a mobile device having a first service stack and a second service stack sharing a single transceiver channel, comprising:
    receiving, in the first service stack, a request for neighboring cell signal measurement data from the second service stack, wherein the request identifies neighboring cells to be measured;
    measuring signal strength of neighboring cells via the first service stack to generate the requested neighboring cell signal measurement data in the first service stack by:
        identifying common neighbor cells between the first service stack and the second service stack; and
        measuring signal strength of any unique identified neighboring cells to be measured and any neighbor cells common among the first service stack and the second service stack only once to generate the requested neighboring cell signal measurement data in the first service stack; and
    providing the requested neighboring cell signal measurement data from the first service stack to the second service stack,
    wherein the first service stack and the second service stack are each associated with a single subscription served by different radio access networks and by one core network.

2. The method of claim 1, wherein the second service stack is in idle mode.

3. The method of claim 1, further comprising:
  determining, in the second service stack, a radio technology of the first service stack;
  determining, in the second service stack, whether the first service stack's radio technology is more efficient than a radio technology of the second service stack; and
  sending the request for neighboring cell signal measurement data to the first service stack in response to determining the first service stack's radio technology is more efficient than a radio technology of the second service stack.

4. The method of claim 1, wherein the request for neighboring cell signal measurement data includes a request for signal strength measurements and a request for cell identification, and
  wherein measuring signal strength of neighboring cells via the first service stack to generate the requested neighboring cell signal measurement data in the first service stack comprises measuring signal strength of neighboring cells via the first service stack and performing cell identification of the neighboring cells via the first service stack to generate the requested neighboring cell signal measurement data in the first service stack.

5. A mobile device, comprising:
  a transceiver; and
  a processor coupled to the transceiver and configured with processor-executable instructions such that a first service stack and a second service stack share a single transceiver channel and the first service stack and the second service stack are each associated with a single subscription served by different radio access networks and by one core network,
  wherein the processor is configured with processor-executable instructions to perform operations comprising:
    receiving, in the first service stack, a request for neighboring cell signal measurement data from the second service stack, wherein the request identifies neighboring cells to be measured;
    measuring signal strength of neighboring cells via the first service stack to generate the requested neighboring cell signal measurement data in the first service stack by:
      identifying common neighbor cells between the first service stack and the second service stack; and
      measuring signal strength of any unique identified neighboring cells to be measured and any neighbor cells common among the first service stack and the second service stack only once to generate the requested neighboring cell signal measurement data in the first service stack; and
    providing the requested neighboring cell signal measurement data from the first service stack to the second service stack.

6. The mobile device of claim 5, wherein the processor is configured with processor-executable instructions to perform operations such that the second service stack is in idle mode.

7. The mobile device of claim 5, wherein the processor is configured with processor-executable instructions to perform operations further comprising:
  determining, in the second service stack, a radio technology of the first service stack;
  determining, in the second service stack, whether the first service stack's radio technology is more efficient than a radio technology of the second service stack; and
  sending the request for neighboring cell signal measurement data to the first service stack in response to determining the first service stack's radio technology is more efficient than a radio technology of the second service stack.

8. The mobile device of claim 5, wherein the processor is configured with processor-executable instructions to perform operations such that:
  the request for neighboring cell signal measurement data includes a request for signal strength measurements and a request for cell identification; and
  measuring signal strength of neighboring cells via the first service stack to generate the requested neighboring cell signal measurement data in the first service stack comprises measuring signal strength of neighboring cells via the first service stack and performing cell identification of the neighboring cells via the first service stack to generate the requested neighboring cell signal measurement data in the first service stack.

9. A mobile device having a first service stack and a second service stack sharing a single transceiver channel, comprising:
  means for receiving, in the first service stack, a request for neighboring cell signal measurement data from the second service stack, wherein the request identifies neighboring cells to be measured;
  means for measuring signal strength of neighboring cells via the first service stack to generate the requested neighboring cell signal measurement data in the first service stack comprising:
    means for identifying common neighbor cells between the first service stack and the second service stack; and
    means for measuring signal strength of any unique identified neighboring cells to be measured and any neighbor cells common among the first service stack and the second service stack only once to generate the requested neighboring cell signal measurement data in the first service stack; and
  means for providing the requested neighboring cell signal measurement data from the first service stack to the second service stack,
  wherein the first service stack and the second service stack are each associated with a single subscription served by different radio access networks and by one core network.

10. The mobile device of claim 9, wherein second service stack is in idle mode.

11. The mobile device of claim 9, further comprising:
  means for determining, in the second service stack, a radio technology of the first service stack;
  means for determining, in the second service stack, whether the first service stack's radio technology is more efficient than a radio technology of the second service stack; and
  means for sending the request for neighboring cell signal measurement data to the first service stack in response to determining the first service stack's radio technology is more efficient than a radio technology of the second service stack.

12. The mobile device of claim 9, wherein the request for neighboring cell signal measurement data includes a request for signal strength measurements and a request for cell identification, and
  wherein means for measuring signal strength of neighboring cells via the first service stack to generate the requested neighboring cell signal measurement data in the first service stack comprises means for measuring signal strength of neighboring cells via the first service stack and performing cell identification of the neighboring cells via the first service stack to generate the requested neighboring cell signal measurement data in the first service stack.

13. A non-transitory processor readable storage medium having stored thereon processor-executable instructions configured to cause a mobile device processor to perform operations such that a first service stack and a second service stack share a single transceiver channel and the first service stack and the second service stack are each associated with a single subscription served by different radio access networks and by one core network, the stored processor-executable instructions configured to cause a mobile device processor to perform operations comprising:
- receiving, in the first service stack, a request for neighboring cell signal measurement data from the second service stack, wherein the request identifies neighboring cells to be measured;
- measuring signal strength of neighboring cells via the first service stack to generate the requested neighboring cell signal measurement data in the first service stack by:
  - identifying common neighbor cells between the first service stack and the second service stack; and
  - measuring signal strength of any unique identified neighboring cells to be measured and any neighbor cells common among the first service stack and the second service stack only once to generate the requested neighboring cell signal measurement data in the first service stack; and
- providing the requested neighboring cell signal measurement data from the first service stack to the second service stack.

14. The non-transitory processor-readable storage medium of claim 13, wherein the stored processor-executable instructions area configured to cause a mobile device processor to perform operations such that the second service stack is in idle mode.

15. The non-transitory processor-readable storage medium of claim 13, wherein the stored processor-executable instructions area configured to cause a mobile device processor to perform operations further comprising:
- determining, in the second service stack, a radio technology of the first service stack;
- determining, in the second service stack, whether the first service stack's radio technology is more efficient than a radio technology of the second service stack; and
- sending the request for neighboring cell signal measurement data to the first service stack in response to determining the first service stack's radio technology is more efficient than a radio technology of the second service stack.

16. The non-transitory processor-readable storage medium of claim 13, wherein the stored processor-executable instructions area configured to cause a mobile device processor to perform operations such that:
- the request for neighboring cell signal measurement data includes a request for signal strength measurements and a request for cell identification, and
- measuring signal strength of neighboring cells via the first service stack to generate the requested neighboring cell signal measurement data in the first service stack comprises measuring signal strength of neighboring cells via the first service stack and performing cell identification of the neighboring cells via the first service stack to generate the requested neighboring cell signal measurement data in the first service stack.

* * * * *